July 23, 1957     F. L. MOSELEY     2,800,292
AUTOMATIC LANDING SYSTEM
Original Filed July 15, 1944     6 Sheets-Sheet 1
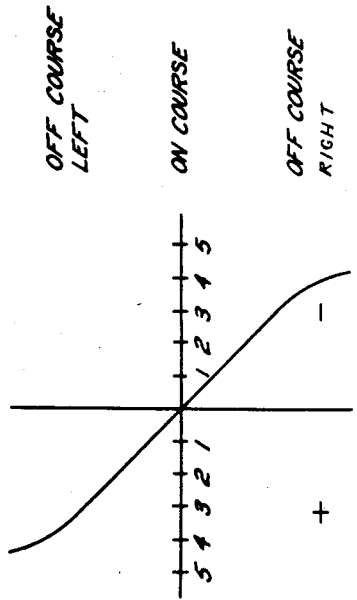
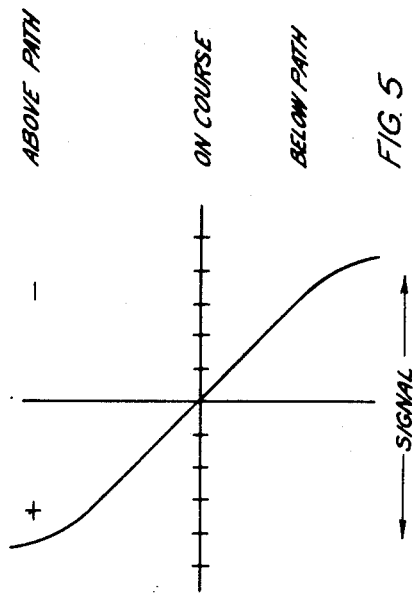
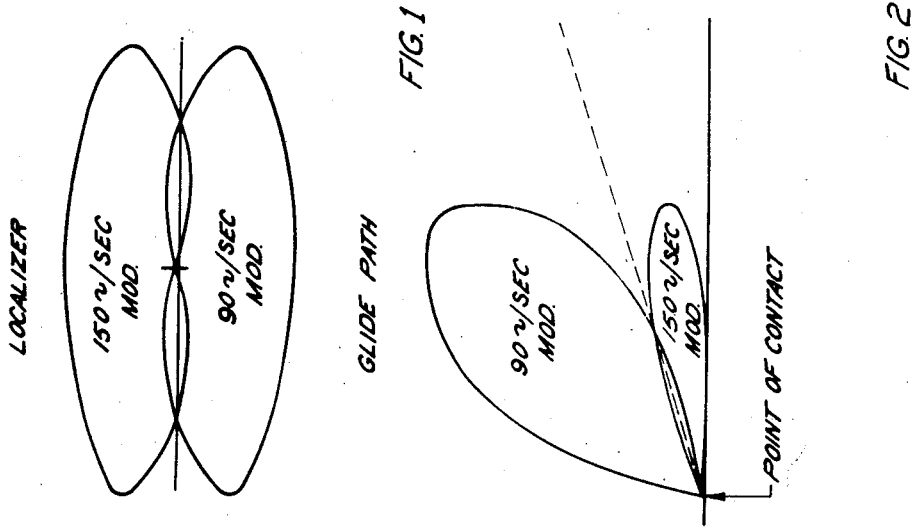
Inventor
FRANCIS L. MOSELEY
By John J. Rogan
Attorney July 23, 1957

F. L. MOSELEY 2,800,292

AUTOMATIC LANDING SYSTEM

Original Filed July 15, 1944

Inventor
FRANCIS L. MOSELEY

John J. Logan
Attorney

July 23, 1957  F. L. MOSELEY  2,800,292
AUTOMATIC LANDING SYSTEM
Original Filed July 15, 1944  6 Sheets-Sheet 5
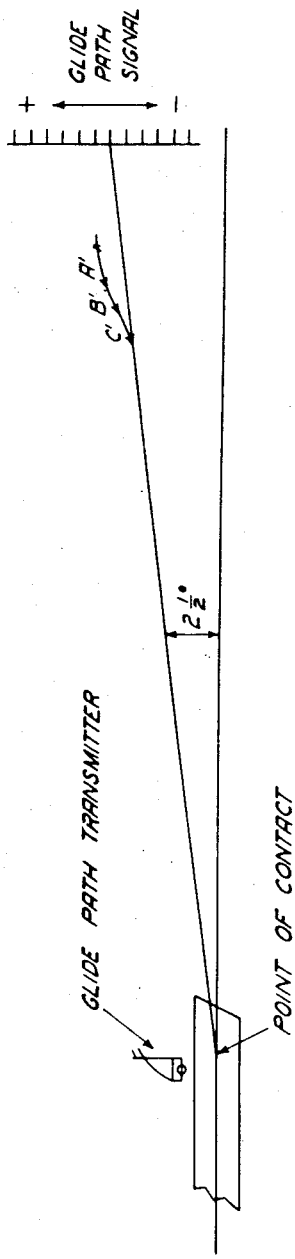
FIG. 8
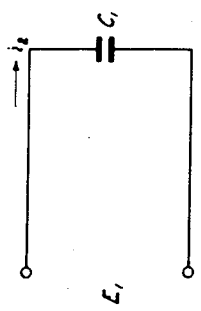
FIG. 10
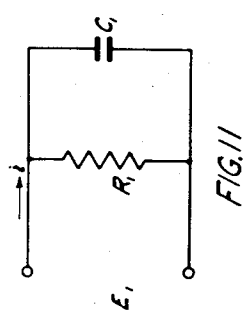
FIG. 12
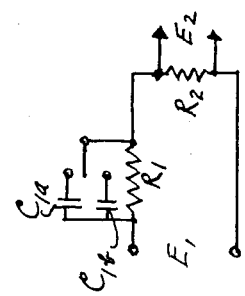
FIG. 13
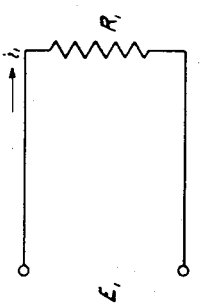
FIG. 9
FIG. 11
Inventor
FRANCIS L. MOSELEY
By John J. Rogan
Attorney July 23, 1957

F. L. MOSELEY 2,800,292

AUTOMATIC LANDING SYSTEM

Original Filed July 15, 1944

Inventor
FRANCIS L. MOSELEY
BY
John J. Logan
Attorney

United States Patent Office 2,800,292
Patented July 23, 1957

2,800,292

AUTOMATIC LANDING SYSTEM

Francis L. Moseley, Cedar Rapids, Iowa, assignor to Collins Radio Company, Cedar Rapids, Iowa, a corporation of Iowa Continuation of application Serial No. 545,173, July 15, 1944. This application May 12, 1948, Serial No. 26,677

16 Claims. (Cl. 244—77)

(Granted under Title 35, U. S. Code (1952), sec. 266)

The invention described in the following specification and claims may be manufactured and used by or for the Government for governmental purposes, without the payment to me of any royalty thereon.

This invention relates to automatic flight control and, in one specific form, relates to a system for controlling the course of flight of aircraft with a view to automatic landing. It is related to the systems of my co-pending applications for United States Letters Patent, Serial No. 378,296, filed February 10, 1941 (now U. S. Patent No. 2,423,336, granted July 1, 1947); Serial No. 505,917, filed October 12, 1943, now Patent No. 2,496,809, issued Feb. 7, 1950; and Serial No. 542,594, filed June 28, 1944.

Complete automatic landing of aircraft has long been a problem. Heretofore, equipment utilizing radio information given by low frequency compass guiding stations and U. H. F. markers was successfully demonstrated. Subsequent work on instrument landing systems in general has resulted in a development which is of the glide path-localizer-marker type, so that the earlier equipment, above referred to, is not applicable for automatic flight on a system of this character. The problem of automatic landing on beam type systems has heretofore been given consideration by applicant as well as by others in this field. Examples of these efforts are found in the above-cited co-pending applications. However, in flying a radio range or localizer with the systems of the first two applications above, it is necessary to set the aircraft initially parallel to the published heading of the localizer of range prior to utilizing the automatic control. If this is not done, then the aircraft, on reaching the on-course position, will have turned back to exactly the original heading and, when this heading is not the runway heading, the aircraft will fly off-course until a restorer signal, having a value sufficient to turn the aircraft back toward course the required amount, is received. The aircraft would then fly toward the station on a line converging on but not coincident with the course line. Errors were also introduced in the system by gyro drift in the automatic pilot, and the effects of crosswinds which forced the aircraft to fly a converging line off-course toward the station.

Applicant in his last-cited co-pending application corrects this condition and restores the aircraft to an on-course line, by taking account of the continuous off-course indication on the cross-pointer instrument and inserts a slow correction toward course, which correction is ordinarily continuously inserted until the aircraft reaches the on-course line.

However, the forms of the systems disclosed in the foregoing applications require not only additional equipment to perform these functions, but also require more power for such operation. The weight that these systems add is, therefore, an appreciable factor. Also, where the distance from course line is great, or the heading deviates appreciably from parallel to course line, the slow correction introduced may not be sufficient to bring the aircraft on-course before the aircraft has reached the end of the runway. Again, when decreasing the altitude in following the glide path, different and varied crosswinds are progressively encountered which will tend to displace the aircraft from course. Under these conditions, the slow correction mechanism may not be sufficient to correct the heading of the aircraft and compensate for the effects of such crosswinds before the aircraft reaches the runway. Applicant, with a knowledge of these defects in and objections to the prior art, has for an object of his invention, the provision of a system of automatic flight control which will permit maximum and full speed correction of the heading of the aircraft at all times to bring the aircraft back on course and maintain it on the course line.

Applicant has, as another object of his invention, the elimination of auxiliary power consuming equipment for operating upon and controlling the operation of the auto pilot equipment of the aircraft, and the substitution of means acting directly upon the aircraft flight controls and, preferably, utilizing parts of the auto pilot mechanism of the aircraft, as well as power supplied from the auto pilot system, thereby largely overcoming the problem of additional power and weight.

Applicant has, as another object of his invention, the provision of automatic flight control for an aircraft which will provide rapid on-course corrections in response to crosswinds of different varieties or rapid changes thereof, and to bring the aircraft back on-course or maintain it there under such changing conditions.

Applicant has as a further object of his invention the provision of automatic flight control of an aircraft for selecting and bring the aircraft on course, irrespective of the heading of the aircraft, so that the system may be rendered operative at any initial heading of the aircraft with respect to course.

The foregoing objects are carried out by measurement of the angular departure of the aircraft from the localizer course line, together with measurement of the rate of change of departure from or approach to the course line by the aircraft. The algebraic addition of voltages produced by departure and rate of change of departure or approach results in the formation of a virtual course in space which is the optimum line for the return of the aircraft to the course line without overshooting or hunting about the course. Since the rate of change of position with respect to the localizer is automatically taken into account, the crosswind problem is solved inherently without the use of auxiliary control apparatus for this purpose.

Other objects and advantages of this invention will appear from the following specification and accompanying drawings, and the novel features thereof wil be particularly pointed out in the annexed claims.

In the drawings:

Fig. 1 shows the field patterns of signals from a localizer.

Fig. 2 shows the field patterns of the glide path transmitter defining the glide path indicated in dotted lines.

Fig. 4 shows graphically the output of the radio range receiver.

Fig. 5 shows graphically the output of the glide path receiver.

Fig. 8 shows a flight path of an aircraft steered onto the glide path.

Fig. 9 shows a resistance of the rate circuit of applicant's invention.

Fig. 10 shows a condenser of the rate circuit of applicant's invention.

Fig. 11 shows the condenser-resistance combination of the rate circuit of applicant's invention.

Fig. 12 shows the rate circuit of applicant's invention.

Fig. 13 shows a vibrator circuit for use in applicant's system.

Fig. 15 shows a modification of the circuit of Fig. 12.

Figure 3:
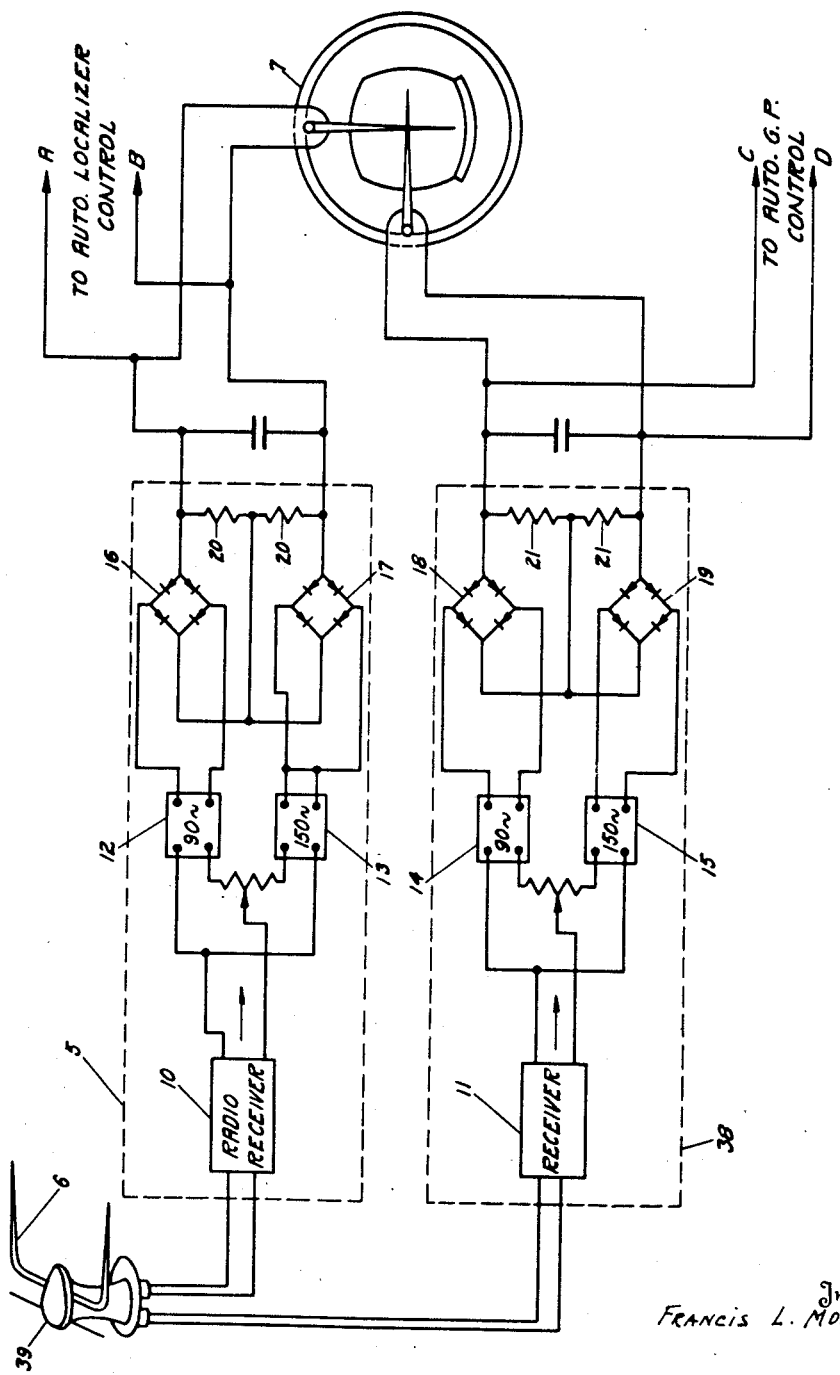
Fig. 3 shows the circuit diagrams of the glide path received and radio range receiver.

The automatic flight control equipment set forth in the preferred embodiment of this invention, and described in detail herein, is particularly well adapted to flying aircraft through the medium of the conventional electric type automatic pilot to guide the aircraft along the localizer and/or glide path beams of the instrument approach system. The localizer employed sets up overlapping field patterns defining an equi-signal plane or line between such patterns indicating the course to the landing strip. This is accomplished by modulating transmitters with different frequencies on each side of the course. It also utilizes radio transmitters provided with suitable antennae setting up a radiation pattern along the line suitable for employment as a glide path to the landing end of the runway. Flight on the localizer involves control of the plane in turn and back, so as to turn it toward and thence along the localizer path to cause it to be brought in over the center of the runway. Flight on the glide path involves control of the plane in pitch, nosing up or down as required, to remain on the path until manual control is again taken by the pilot himself, at a point in line with the runway and close to the ground, just prior to final touchdown. Power settings as required to maintain proper air speed, flap setting, wheels down, choice of proper R. P. M., etc., may remain under the manual control of the pilot or alternatively may be automatically set or controlled by auxiliary apparatus of conventional type not forming a part of this application.

Operation of the system is independent of crosswinds. Computing circuits are incorporated which automatically and continuously determine the instantaneous heading of the aircraft so that the said heading traces a substantially smooth asymptotic path toward the radio defined course without assistance from the pilot, and when the aircraft reaches the said course after its asymptotic approach thereto it remains on said course with the proper heading independently of crosswinds. Approach to and along the localizer is effected from any initial heading provided only that the aircraft is in an area preferably approximately 15 degrees in width, and the approach is started far enough out to give the air space required to complete the approach to the localizer line, prior to reaching the runway.

Referring to the drawings in detail, Fig. 1 shows a plan view of the overlapping field patterns set up by the localizer, modulated at preferably 90 and 150 cycles on alternate sides of the course. The course is defined by the equi-signal line between the two modulation patterns. Fig. 2 shows a simplified elevation view of the glide path system, the glide path line being defined by the equi-signal line between the two patterns. The glide path is a straight line extending from the point of contact on the runway to a distance of about fifteen miles at an elevation angle of preferably approximately two and one-half degrees.

Fig. 3 shows the usual radio range receiver responsive to the doubly-modulated radiation field indicated in Fig. 1. It also shows the usual glide path receiver responsive to the doubly-modulated radiation field indicated in Fig. 2. The antennae 6, 39 are conventional and feed the RF signals into conventional receivers 10, 11, where normal amplification and detection take place, producing the two modulated frequencies in their outputs. The output signals in each case constitute alternating currents of the respective modulations of the field pattern, and are proportional to their respective amplitudes as determined by the location of the aircraft in space. The output signals are separated by passing them respectively through 90 and 150 cycle band-pass filters 12, 13 and 14, 15. The outputs of such filters are fed to rectifier networks 16, 17 and 18, 19. As is well-known, the rectifier network produces a direct current signal proportional to the relative strength of the modulation frequencies of the field pattern, varying in sign in dependency on which modulation frequency predominates, and falling to zero where the field strengths are equal. In this way a signal is provided which gives information relative to the position of the aircraft with regard to the radio defined course. The outputs of rectifiers 16, 17 are fed across tapped resistor 20, while the outputs of rectifiers 18, 19 are fed across tapped resistor 21. In this way the information appears across resistors 20 and 21 in the form of voltage drop. The D. C. signal which appears across resistors 20 and 21, after being differentially rectified at 16, 17 and 18, 19, is zero when the aircraft is on course and increases in value in a positive or negative sense when the aircraft departs from either the localizer beam or the glide path beam. The general character of the resulting signal appearing across resistor 20 is shown in Fig. 4, while that appearing across resistor 21 is shown in Fig. 5.

In Fig. 3, the glide path and localizer signals are fed to the pilot's indicator of the cross-pointer type, the localizer being indicated by motion of the vertical needle and the glide path by motion of the horizontal needle. The lines leading to the two movements of the instrument are tapped and fed to the automatic control equipment which is thus supplied with a variable magnitude reversible D. C. signal proportional to deviation from the on-course line in either the horizontal or vertical plane.

Figure 6:
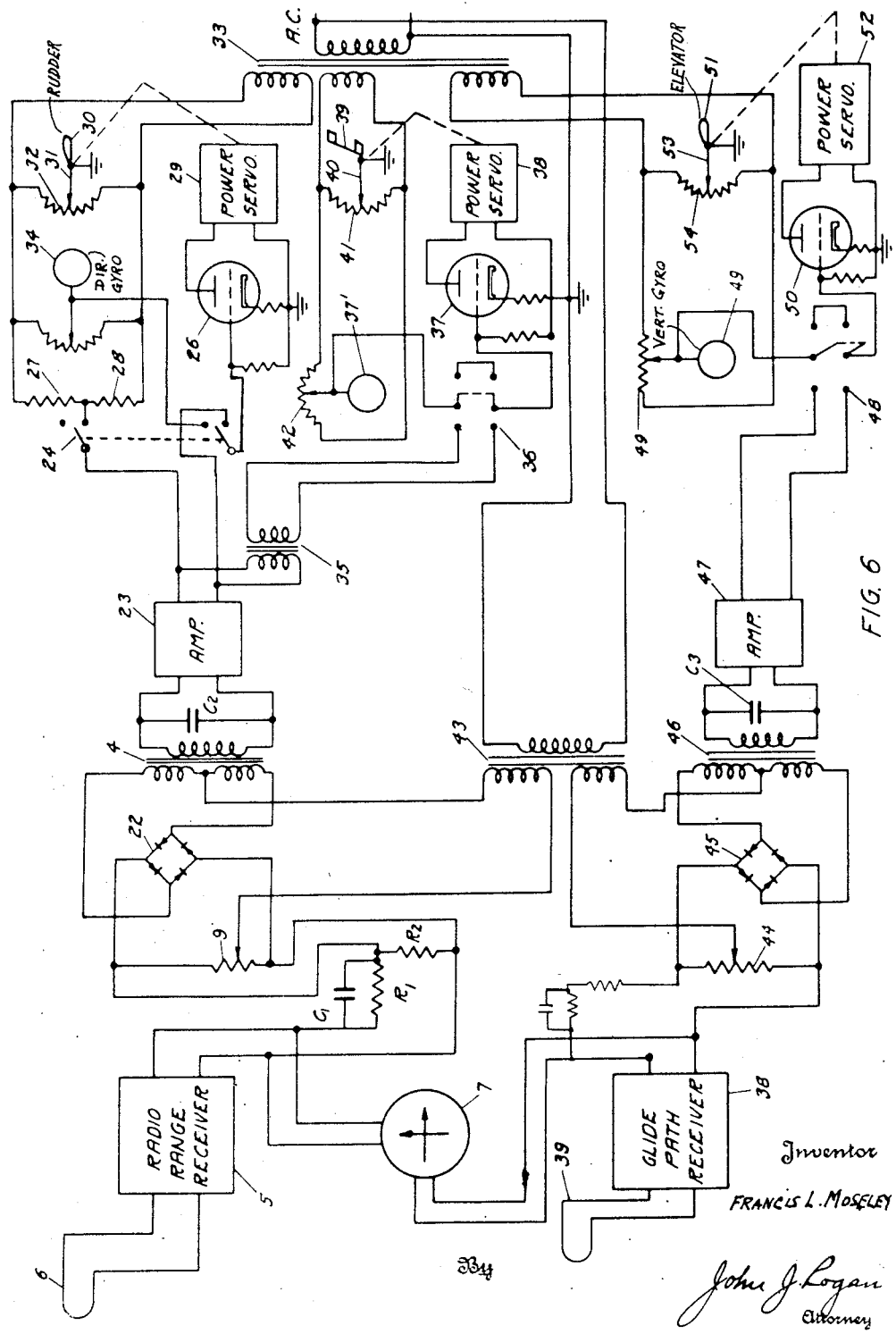
Fig. 6 shows one form of the automatic landing control system.

Referring to Fig. 6, the R. F. signal, as indicated above, is received on antenna 6 and is passed through radio range receiver 5, where amplification, detection, separation of modulation components, and rectification takes place to produce a D. C. signal whose strength varies according to the angular distance of the aircraft from the course line or glide path, as the case may be. The output of the radio range receiver 5 is then fed through a rate circuit $C_1$, $R_1$, $R_2$, to be described more in detail hereinafter, to the outer terminals of a center-tapped resistance 9 and on to the opposite points of a ring modulator 22, while the diagonally opposite points of a ring modulator 22 are connected to the outer terminals of center-tapped primary of input transformer 4. Center-tapped input resistor 9 is preferably fed with A. C. from the automatic pilot rotary inverter through transformer 43; the other side of this A. C. being fed to the center-tap of the input of primary winding of transformer 4. As long as the input D. C. across the outer terminals of resistor 9 is zero, a condition of balance exists in the circuits, including resistor 9, ring modulator 22, and the two primary windings of transformer 4, so that equal and opposite alternating currents flow in the two primary windings of transformer 4, setting up fluxes which are equal and opposite and which cancel out each other. When the input D. C. across the outer terminals of resistor 9 is other than zero, ring modulator 22 is biased so that it presents paths of unequal conductivity to the primary windings of the input transformer 4 and resultant A. C. is stepped up in the transformer and appears at the output terminals of the secondary of such transformer. Across the terminals of the secondary of transformer 4 is a tuning condenser $C_2$ for restoring the wave shape of the signal which becomes distorted in the ring modulator. The secondary of the transformer 4 then feeds into the input circuit of a conventional amplifier 23, having sufficient stages to raise the signal level to a point suitable for introduction into the control circuits of the automatic pilot equipment. The foregoing comprises the elements of the amplifier-modulator, which, it will be observed, converts a low level reversible D. C. signal into a high level reversible phase A. C. signal in proper phase, and synchronized with the automatic pilot equipment control voltage. The output of amplifier 23 is then fed into the circuits of a standard automatic pilot system, such as Minneapolis-Honeywell type, and for the purpose of this application, only a simplified showing of the control circuits utilized is made. The variable magnitude reversible phase signal from the amplifier-modulator, which is the output from amplifier 23, is fed through switches 24, 25 to bridge resistors 27 and 28 and the grid of amplifier tube 26. The signal reaching the grid of the amplifier tube 26 is amplified and fed through the conventional electric power servo system 29 to actuate rudder 30 of the aircraft. The motion of the rudder carries potentiometer arm 31 across bridge potentiometer 32, thus upsetting the balance of the A. C. bridge, including resistors 27, 28, potentiometer 32 and transformer 33, and providing a follow-up signal which cancels out the input signal from amplifier 23 when the rudder movement has reached the proper value for the applied signal from the amplifier-modulator. It will be noted that when amplifier 26 is in use with potentiometer 32, switch 25 is operated to its lower contact and disconnects the normal directional repeat back signal from the directional gyro 34 and, therefore, removes the system from control of such gyro. For either type of control, switch 24 is closed. Therefore, the rudder 30 is turned by an amount proportional to the signal furnished by the amplifier-modulator and is not returned to its streamlined position by a counter-acting signal from the directional gyro, as would be the case ordinarily.

Signals from the amplifier-modulator are also fed from the output of amplifier 23 through coupling transformer 35 into the auto pilot equipment through switch 36 to a horizontal gyro potentiometer 42 and grid of amplifier tube 37. This signal actuates the aileron servo mechanism of conventional form, causing the aircraft to bank until the input A. C. to amplifier tube 37 is bucked out by follow-up signal from the A. C. bridge. The ailerons 39 are moved in response to power furnished by power servo unit 38, and this operates the potentiometer 40 in a conventional manner causing it to move over bridge potentiometer 41 upsetting the balance of the A. C. bridge, including potentiometers 41, 42 and A. C. power source 33. At this time the ailerons have returned to their streamlined position and the aircraft has assumed an angle of bank as ordered by the signal from the amplifier-modulator, and as measured by the movement of gyro repeat power potentiometer 42.

Cross connections between the A. C. bridge systems controlling rudder and ailerons are provided as a normal part of the automatic pilot equipment so that the rudder and ailerons are returned to a streamlined position, once the aircraft has assumed the desired rate of turn and angle of bank. Explanation of the action of gyro 37' in this operation will be described later. Since these cross connections are a normal feature of the automatic pilot equipment and, since they in no way affect the circuit description of the automatic landing equipment, they are omitted from Fig. 6 for the sake of simplicity, but are described more in detail hereinafter.

Figure 7:
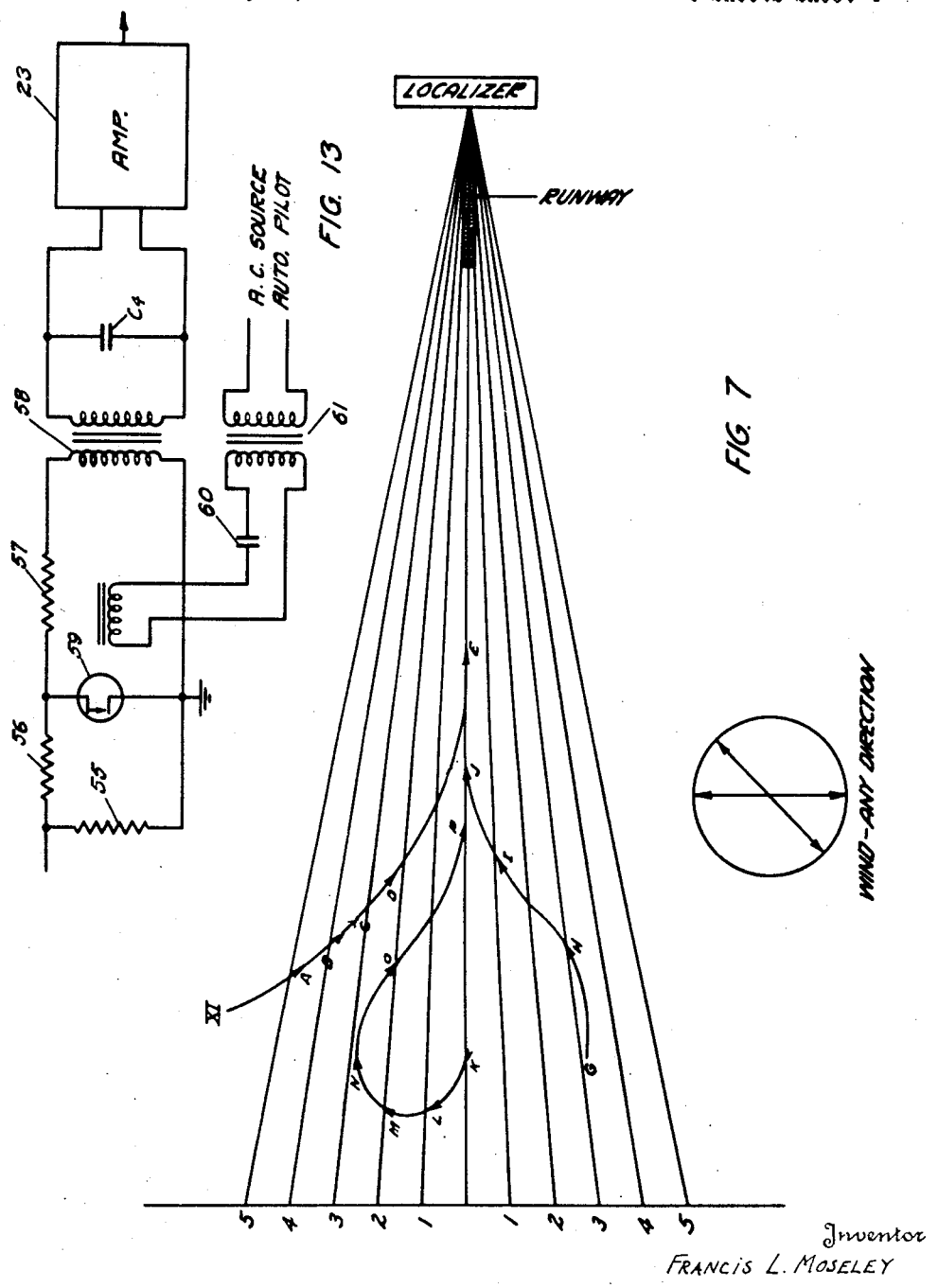
Fig. 7 shows a flight path of aircraft steered automatically on to the localizer course.

Having thus described the mechanism which converts the localizer signals to the required A. C. form and having shown how these signals order corresponding rates of turn and angles of bank, it will be shown how the localizer signals are modified before entering the amplifier-modulator, so that orders will be issued to the automatic pilot equipment which will result in the aircraft being flown toward and along the localizer down the runway center line on the established radio defined course line, irrespective of wind conditions and without aid from the pilot. Referring to Fig. 7, an aircraft is shown at XI as heading toward the localizer course at an angle of approximately 60 degrees, at which time the automatic course control is rendered operative. The path of the aircraft from this point onward passes through points A, B, C, D, E. Signals acting to control the aircraft along this path will now be considered. At point A, the aircraft is off the localizer course by an angle of departure of five arbitrary units. The aircraft is approaching course at a velocity dependent upon its velocity in space and its angular heading with respect to course.

Interposed between the cross-pointer instrument 7 and the amplifier-modulator is a rate circuit, as indicated in Fig. 6, wherein voltage divider network $R_1$, $R_2$ inserts a steady state loss of not less than ten to one. Resistor $R_1$ is shunted by a large condenser $C_1$, so that charge and discharge currents flowing in resistor $R_2$ are made available to insert signals which are responsive to the rate of change of position of the aircraft with respect to course. The action of this circuit may best be understood by a brief mathematical consideration of the functioning of its components.

Consider $E_1$ as the voltage impressed across the input of the rate circuit as a result of the off-course position of the aircraft. Then the current flowing through resistor $R_1$, Fig. 9, may be represented under Ohm's law, as follows:

$$i_1 = \frac{E_1}{R_1}$$

If the same voltage is impressed across the condenser $C_1$, Fig. 10, the current may be represented as follows:

$$i_2 = C_1 \frac{dE_1}{dt}$$

It is thus seen that the current flowing as a result of the condenser is proportional to the rate of change of voltage across the circuit, that is, the rate of change of position of the aircraft with respect to the course line.

Now, if the two circuits be combined, as in Fig. 11, the current flowing may be represented by the sum of the currents flowing in the resistance and the condenser as:

$$i = i_1 + i_2 = \frac{E_1}{R_1} + C_1 \frac{dE_1}{dt}$$

Now, if the resistance $R_2$ be inserted in series with the circuit of Fig. 11, as shown in Fig. 12, then the voltage across resistance $R_2$ may be approximately represented as:

$$E_2 = R_2 i$$
$$= R_2 \left(\frac{E_1}{R_1} + C_1 \frac{dE_1}{dt}\right)$$

However, if the size of the resistance $R_2$ is relatively small so as to not appreciably upset the current relations as they appeared in the circuit of Fig. 11, then the approximation represented by the last equation above is sufficiently accurate for practical purposes. In practice, it has been found that if the value of $R_2$ is not greater than one-tenth of that of $R_1$, then the current and voltage relations set forth in the above equation are not appreciably altered.

From the above it will be seen that the voltage across resistance $R_2$ and, therefore, the voltage impressed upon the amplifier-modulator is made up of components resulting from the presence of the resistance $R_1$, which is dependent upon the distance of the aircraft from course, and a second component resulting from the presence of the condenser $C_1$, which is dependent upon the rate of change of voltage impressed across the network and is, therefore, dependent upon the rate of change of the distance of the aircraft from the course line. The resistance $R_2$, in effect, serves primarily as a means for picking off or reflecting changes in voltage corresponding to changes in current relation in the condenser-resistance combination $C_1$, $R_1$, so that they may be utilized to influence the operation of the amplifier-modulator.

It is seen that during periods of increasing signal from the cross-pointer instrument, that is, when the aircraft is moving away from course, condenser $C_1$, in effect, by-passes resistance $R_1$ and larger currents flow in resistance $R_2$ than would be indicated by the use of resistance $R_1$ alone.

Now, if the input D. C. signal decreases due to the aircraft approaching the on-course line, the condenser $C_1$ discharges through resistance $R_2$ and this discharge current opposes the signal current flowing in $R_2$ due to the normal voltage drop in $R_1$, $R_2$. The opposing effect of discharge currents supplied by condenser $C_1$ may be sufficient to cause the net drop in resistance $R_2$ to be opposite in polarity to the rate circuit input voltages from the radio range receiver 5.

It follows that the voltage across resistance $R_2$ is a function of (1) the lateral displacement of the aircraft from the course line and, (2) rate of change of lateral position with respect to the course line. Thus for any given lateral displacement from the on-course line, there is only one heading which will give the aircraft a cross course component sufficient to just balance out the signal due to displacement from the course. For example, at point A, where the aircraft is five units from course, a strong displacement signal exists. The aircraft would, therefore, be ordered to turn to the right were it not for its rapid approach to course along the line shown. This rapid approach causes rate circuit currents to flow in a direction to more than equal the rate signal and slowly turn the aircraft to the left to anticipate the approach of the on-course line.

The effect just described takes into account wind of any direction or magnitude, since the cross-course component of wind automatically causes the rate circuit condenser to charge or discharge at a rate different from the no wind case and, hence, an automatically compensating turn signal is inserted to turn the aircraft to the proper angle to ride down the cross center line regardless of wind conditions.

Passage of aircraft through successive points B, C, D, etc. is accompanied by progressive changes in the displacement of the aircraft from the course resulting in progressive decrease of the heading of the aircraft with respect to the course line.

Consider now the flight path shown through points G, H, I, J, of Fig. 7. Assume the aircraft roughly parallel to course at G. The following action takes place:

| Location of Aircraft | Action |
| --- | --- |
| G | Aircraft parallel to course. Automatic control switched on. Aircraft starts turn to left as ordered by displacement signal. |
| H | Aircraft stops turn to left since rate of approach to course is now sufficient to produce a rate signal which cancels out the displacement signal. |
| I | Aircraft approaching course too rapidly for low value of displacement signal being received. Right turn results from excess of rate signal over displacement signal. |
| J | Aircraft on and parallel to course. Displacement signal is zero; rate signal is zero. |

Consider now the case of an aircraft flying through points KLMNOP. The following action takes place:

| Location of Aircraft | Action |
| --- | --- |
| K | Aircraft headed away from station on reverse heading—auto course control switched on—right turn is started by small displacement signal. |
| L | Displacement signal is supplemented by rate of change signal due to rapid increase of displacement signal. Aircraft is turned strongly to right. |
| M | Right turn continues at high rate. |
| N | Aircraft now rapidly approaching course—right turn is stopped by opposing rate signal resulting from rapid decay of displacement signal. |
| O | Aircraft turns to left as a result of excess of reverse rate signal over displacement sign. |
| P | Aircraft on course and parallel to course. Displacement zero, rate zero, rate of turn zero. |

It will be observed that the plane maneuvering or flying on-course in the area A, B, C, D, in Fig. 7, is in a region of comparatively low positional course sensitivity. As the aircraft moves closer to the localizer, much higher positional sensitivities are encountered. This variation in course sensitivity is compensated for by the use of two rate circuit condensers. Condenser $C_1$ of Fig. 6 may, for example as shown in Fig. 15, comprise two condensers $C_{1a}$ and $C_{1b}$, the larger value of condenser being used at large distances and the smaller value being used close to the field. For convenience, the switching operation is performed coincident with the interception of the glide path which occurs usually at a point about five miles from the field.

The glide path beam, which is of the straight line type, is received, detected, filtered and indicated by glide path receiver 38, as described in connection with Fig. 3. Voltages from the terminals of cross-pointer intrument 7 are fed to the outer terminals of center-tapped resistor 44 and on to the opposite points of a ring modulator 45, while the diagonally opposite points of the ring modulator 45 are connected to the outer terminals of center-tapped primary of input transformer 46. Center-tapped input resistor 44 is preferably fed with A. C. from the automatic pilot rotary inverted through one of the secondaries of transformer 43, whose primary is connected in turn to the input of transformer 33. The other side of this A. C. from transformer 43 is fed to center tap of the input of primary winding of transformer 46. As previously pointed out in connection with the rudder and bank control circuits, when the input D. C. across the outer terminals of resistor 44 is zero, a condition of balance exists in the circuits, including resistor 44, ring modulator 45, and the two primary windings of transformer 46, so that nothing appears across the secondary of the transformer. When the D. C. across the outer terminals of resistor 44 is other than zero, ring modulator 45 is biased so that is presents paths of unequal conductivity to the primary windings of transformer 46, and the resultant A. C. is stepped up in the transformer and appears at the outer terminals of the secondary of the transformer. Across the terminals of the secondary of transformer 46 is a tuning condenser $C_3$ for restoring the wave shape of the signal which becomes distorted in passing through the ring modulator. The secondary of the ring modulator 46 then feeds into the input of conventional amplifier 47 having sufficient stages to raise the signal level suitable for introduction into the control circuits of the automatic pilot equipment.

The foregoing constitutes the elements of an amplifier-modulator and are similar in form and function to those of the amplifier-modulator employed in the rudder and bank control circuits previously described.

The output of amplifier 47 is then fed into the circuit of a standard automatic pilot, such as the Minneapolis-Honeywell type, and, for the purpose of this application, only a simplified showing of the control circuits utilized is made. The variable magnitude reversible phase signal from the amplifier-modulator appearing at the output of amplifier 47 is fed through switch 48 to the horizontal gyro potentiometer 49 and grid of amplifier tube 50. This signal operates the elevator servo mechanism of conventional form, causing the upward or downward motion of the elevator 51 until the input A. C. to the amplifier tube is bucked out by a follow-up signal from the A. C. bridge. The movement of the elevator 51 by the servo 52 results in movement of the potentiometer arm 53 of the potentiometer 54 over bridge potentiometer 54, upsetting the balance of the A. C. bridge, including potentiometers 49 and 54 and A. C. power source 33. This results in a change of the fore and aft attitude of the aircraft corresponding to the magnitude of the inserted signal. This may be explained, as follows:

1. Aircraft is above glide path.
2. Cross-pointer voltage from glide receiver 38 is proportional to angular departure of the aircraft from glide path.

3. Amplifier-modulator produces A. C. signal corresponding to factors set forth in paragraphs one and two above.

4. Inserted A. C. voltage causes servo system 52 to drive elevator off center to balance out inserted voltage and bring servo system to rest by unbalancing A. C. bridge 49, 54.

5. Aircraft noses down until elevator is streamlined and gyro potentiometer has produced voltage equal and opposite to signal inserted by amplifier-modulator.

6. As aircraft nears glide path, reverse elevator is applied since reduction of glide path signal permits gyro potentiometer voltage to take control and actuate servo system 52 in opposite direction changing the position of the elevator 51 to nose-up position.

The path taken by the aircraft approaching the glide path is shown in Fig. 8. It may be found desirable to insert a rate circuit in the glide path signal circuit similar to that used for the localizer, and as shown in Fig. 6. Such a rate circuit, if used in combination with the horizontal gyro repeat back circuit, as shown in Fig. 6, would serve to anticipate approaches to and departure from the course line, and would, therefore, damp any tendency to hunt about the glide path. The basic asymptotic approach to the glide path, as shown in Fig. 8, would, however, be determined by continuous automatic re-balancing of gyro repeat back signal against glide path departure signal.

Referring again to Fig. 6 of the drawings, the ring modulator of that circuit may be replaced by an electromagnetic vibrator as shown in the modficiation of Fig. 13. The vibrator 59 is fed with A. C. from the auto pilot source just as in the case of the ring modulator. The A. C. feeds through transformer 61 and condenser 60 to the coil of vibrator 59 to periodically interrupt the circuit containing the movable contacts of the vibrator. The D. C. from the rate circuit is fed across resistor 55 and the contacts of vibrator 59 serve to break the D. C. circuit, causing the interrupted D. C. to be in phase with the voltage source of the auto pilot, since the contacts move in response to the action of currents in the windings of the vibrator 59, and such coil is energized by A. C. from the auto pilot. This interrupted D. C. is fed through transformer 58 and condenser C₄ to conventional amplifier 23' and on to the succeeding circuits, just as in the case of amplifier 23 of Fig. 6. This same arrangement may be employed for the glide path circuit in the place of ring modulator 45.

Figure 14:
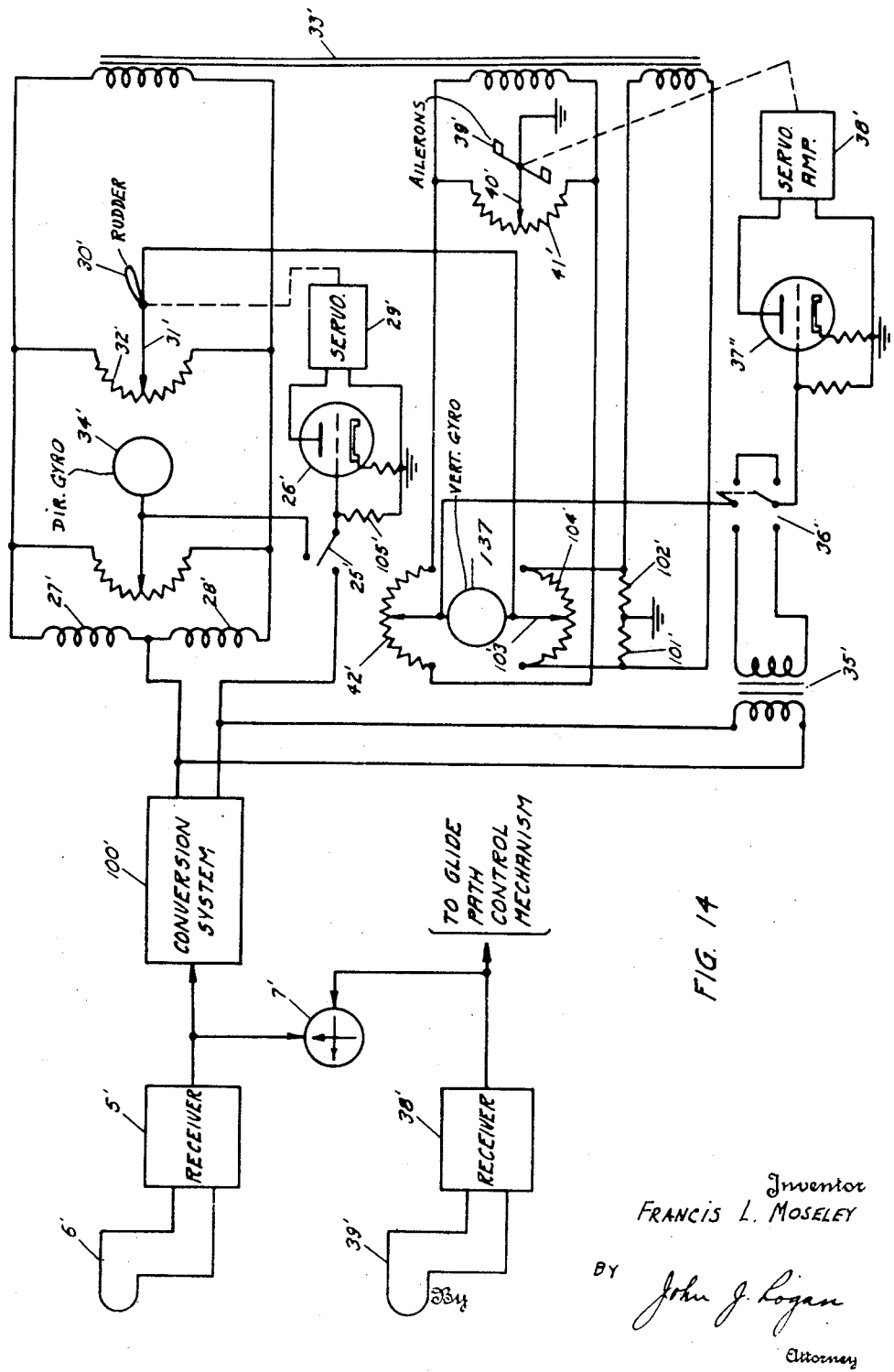
Fig. 14 shows one embodiment of the system with the cross connections to the automatic pilot.

Fig. 14 shows the cross connections to the automatic pilot referred to heretofore. In this drawing 6' is the conventional antenna, 5' is the radio range receiver described in connection with Fig. 3, 7' is the conventional cross-pointer instrument, 39' is the glide path antenna, 38' is the glide path receiver described in connection with Fig. 3, 35' is the transformer coupling the input circuit to the radio range receiver circuit, and 100' is the conversion system including the rate circuit and amplifier-modulator circuit of Fig. 6.

The servo control amplifiers 26', 37' control the power servo systems 29', 38', which control the position of the rudder and ailerons, as in Fig. 6. The directional gyro 34' with its bridge potentiometer is the same as in Fig. 6. The horizon or vertical gyro 37''' is provided with an additional wiper or potentiometer arm 103', which wipes potentiometer 104' of the bridge circuit including resistors 101', 102' fed from an additional winding of the transformer 33' of the auto pilot. The bridge including potentiometers 42', 40' is the same as disclosed in Fig. 6, so also is the bridge including potentiometer 32', and resistors 27', 28'.

In operation, when the receiver 5' gives an off-course signal and this is passed through the conversion system 100' to the grids of tubes 26', 37', the servo 29' and the servo 38' move the rudder 30' and the ailerons 39' to a position to introduce a change of heading of the aircraft to correspond to that ordered by the rate circuit in order to return the aircraft to on-course position. This changes the settings of potentiometers 32' and 41', causing their respective bridge circuits to unbalance and provide a follow-up signal to amplifiers 26' and 37', respectively in opposition to signal from conversion system 100'. This continues until the follow-up signals balance out the signal from the rate circuit and servos 29', 38' cease to function, and the ailerons cease to move. As a result of this action, the aircraft swings about to its new position causing gyro 37''' to move the wipers or arms over the potentiometers 42', 104', upsetting the balance of the bridge 104', 101', 102' and providing a repeat back voltage through arm 31', potentiometer 32', resistors 27', 28', grid resistor 105' to ground, causing amplifier 26' and servo 29' to return the rudder to streamline position once the aircraft has assumed to the desired rate of turn. This tends to restore the balance of the bridge circuit by movement of arm 31' over potentiometer 32'. The ailerons 39' are returned to their streamline position by the action of gyro 37''' which causes the wiper of potentiometer 42' to move as it did wiper 103' when the aircraft assumed its new attitude, mentioned above, thus further upsetting the bridge including potentiometer 41', and causing the repeat back voltages fed therefrom to amplifier 37' and servo 38' to return the ailerons to positions and partially restore the balance of the bridge circuit through the movement of arm 40' over potentiometer 41'. Of course it will be understood that as the aircraft approaches the course line, the output from the rate circuit changes so that the repeat back voltage from bridges containing potentiometers 32', 42' or 104' being in opposed relation thereto, may predominate and control the servos 29', 38' and in turn the elements they control.

This application is a continuation of application Serial No. 545,173, filed July 15, 1944, now abandoned.

What is claimed is:

1. In a radio-controlled system for controlling the flight of an aircraft and of the kind employing a radio beam for producing a positional signal which varies in strength according to the displacement of the aircraft from a radio-defined course line in said beam, and including automatic power means responsive to signal variations for applying power to a steering element such as a rudder of the aircraft for directing its flight, a single radio receiver responsive to such positional signal and delivering a direct current varying in magnitude and polarity according to the displacement of the craft with respect to said course line, a rate-of-change circuit to which said direct current is applied and including both a capacitor and a resistor for developing voltage components representing respectively the strength of said positional signal and its rate of change and including means to algebraically add said components for producing a resultant control signal, and means for applying said resultant control signal to said power means to constrain the aircraft heading to follow a substantially continuous asymptotic approach path until it reaches said course line without requiring any definite relation between the aircraft heading and said course line as the aircraft enters the effective area of said beam, the last mentioned means including an electrical balancing circuit having one element thereof which is movably adjusted in unison with the setting of said steering element.

2. A radio control system for automatically controlling the flight of an aircraft in response to a radio beam having a course-defining line comprising on the aircraft, a steering element such as a rudder, comprising in combination, a radio receiver to set up in its output a variable-polarity and variable-magnitude signal according to the direction and magnitude of the displacement of the aircraft from said course line, automatic control means for said steering element, electric circuit means to which said signal is applied to convert it into another signal consisting of two algebraically-added components, one component continuously representing the magnitude of said displacement as it is being varied under control of said automatic means, and the other component representing the rate of change of said displacement; said automatic control means including a balancing arrangement, and means to control the balancing of said arrangement in accordance with the setting of said steering element and in accordance with the said converted signal but independently of any fixed initial heading of the aircraft for continuously moving said steering element in proportion to said converted signal and thereby automatically constraining the aircraft heading to continuously align itself with a substantially continuous asymptotic approach path to said course line both when the aircraft is initially headed towards said line as it enters the effective area of said beam and when it is headed away from said line as it enters the effective area of said beam, the last mentioned means including an electrical balancing circuit having one element thereof which is movably adjusted in unison with the setting of said steering element.

3. A radio-controlled flight system according to claim 2 in which said signal-converting means includes a capacity-resistance network for producing a derivative of said variable amplitude signal to represent the said rate of change of displacement, said converting means including means for algebraically adding said components, and means for applying the converted signal to control said steering element and including an automatic balancing arrangement controlled both by said converted signal and by the movement of said steering element to produce a null signal when the aircraft is following said asymptotic approach.

4. A radio-controlled system for automatically controlling the flight of an aircraft under control of a radio field having an equi-signal track, a single radio receiver and a differentiating net-work on the aircraft to produce at the output of said receiver a signal under control of said field which signal has characteristics representing respectively the sense of displacement of the aircraft from said track and the magnitude of said displacement and the rate of change of said displacement, a steering element such as a rudder for the aircraft, and means including a voltage-balancing network to apply said signal for continuously controlling said steering element independently of any fixed orientation device on the aircraft to constrain the aircraft heading to trace a substantially continuous asymptotic path towards said track both when the initial heading of the aircraft in a direction towards said track and when said initial heading is in a direction away from said track, the last mentioned means including an electrical balancing circuit having one element thereof which is movably adjusted in unison with the setting of said steering element and without requiring any particular initial heading setting for the aircraft at the time it enters said field.

5. A radio-controlled system for directing the flight of an aircraft under control of a radio beam having a track-defining line for an aircraft to be controlled, a radio receiver and a differentiating network on the aircraft responsive to signals from said beam and including means to produce a positional signal which has characteristics representing respectively the sense of displacement of the aircraft from said track and the magnitude of said displacement and the rate of change of said displacement, a steering element such as a rudder for said aircraft, and means controlled by said positional signal and independently of any fixed orientation devices on the aircraft for automatically and continuously constraining the aircraft heading to continuously align itself with an asymptotic approach path towards said track both when the initial heading of the aircraft is in a direction towards said track and when said initial heading is in a direction away from said track, the last mentioned means including an electrical balancing circuit having one element thereof which is movably adjusted in unison with the setting of said steering element.

6. In a system for automatically constraining an aircraft heading to trace an asymptotic approach to a radio-defined track, comprising in combination, on the aircraft a signal-responsive steering element such as a rudder, a single radio receiver having a voltage differentiating network for deriving a voltage component corresponding to the craft displacement from said track and another voltage component corresponding to the rate of change of said displacement, means movable in unison with said rudder for producing a third voltage corresponding to the position of a steering control element, and means for coordinating said components with said third voltage to produce a resultant steering control voltage which is independent of any fixed orientation device on the aircraft and which is maintained at an effective null value continuously while the craft heading is aligned with said asymptotic path, the last-mentioned means being effective both when the initial heading of the craft is in a direction towards said track and when it is in a direction away from said track.

7. Automatic flight control apparatus for an aircraft, comprising in combination, radio receiver means to produce a positional signal, a single radio receiver to derive from said signal a direct current voltage having a first component representing the displacement of the aircraft from a radio-defined track and a second component representing the rate of change of said displacement, an arrangement for algebraically adding said components, a steering control element, an automatic pilot for automatically controlling said steering element by said positional signal said automatic pilot including a servo-motor device for operating said steering element, a directional gyro, a balancing network having a first voltage-adjusting means operated by said gyro, a second voltage-adjusting means operated by said steering element, switch means effective in one position to compare the voltage from the first adjusting means with said derived voltage to cause said device to automatically move said steering element under control of said gyro, and effective in another position to compare the voltage from the second adjusting means with said derived voltage to automatically move said steering means independently of said gyro and thereby to constrain the aircraft heading to trace a substantially continuous asymptotic approach to said track.

8. Automatic flight control apparatus according to claim 7, in which said arrangement for algebraically adding said components comprises a resistance-condenser network.

9. Automatic flight control apparatus according to claim 7, in which the said first voltage-adjusting means comprises a potentiometer having a movable arm operated under control of said gyro and said second voltage-adjusting means comprises another potentiometer having a movable arm movable with said steering element.

10. A system for automatically steering an aircraft or similar vehicle in response to the setting up in space of an angularly divergent radio localizer beam of the equi-signal type and independent of gyro stabilizers or similar fixed orientation devices on the aircraft, comprising in combination, one localizer receiver on the aircraft having means in its output to derive from said beam and the position of the aircraft therein an output signal having a pair of electric signal components one component having a magnitude proportional to the lateral spatial displacement of the aircraft with relation to the equi-signal line of said beam and corresponding to the direction of said lateral displacement, the other component having a magnitude which varies at a rate proportional to the rate of change of said lateral displacement of the aircraft with respect to said equi-signal line, means to add said two signal components algebraically to produce a resultant signal, steering control means including a rudder for the aircraft, means movable in unison with said rudder to derive a control voltage, and means to balance said resultant signal and said control voltage for application to said steering control means to continuously constrain the aircraft heading to continuously align itself with an asymptotic approach to said line and determined continuously by the ratio of said two components and for all settings of the initial heading of the aircraft as it enters said beam.

11. A system for automatically steering an aircraft or similar vehicle in response to a radio beam of the equi-signal guide-line type and independently of gyro stabilizers or similar fixed orientation devices on the aircraft, comprising in combination, a signal radio receiver on the aircraft having in its output a net-work to derive from said beam and the position of the aircraft therein an electric signal which is the algebraic sum of two components one of which is proportional to the actual lateral spatial displacement of the aircraft with respect to said guide-line and the other of which is proportional to the rate of change of said lateral displacement, a steering control means including a steering element such as a rudder for the aircraft, and means to apply said electric signal to cause said steering control means to continuously maintain the heading of the aircraft aligned with an asymptotic trace towards said line for all initial headings of the aircraft as it enters said beam and for thereafter maintaining said aircraft with its heading coincident with said line after it reaches said line, the last mentioned means including an electrical balancing circuit having one element thereof which is movably adjusted in unison with the setting of said steering element.

12. Apparatus for automatically controlling the flight of an aircraft or similar vehicle in response to a radio beam of the equi-signal guide-line type and independently of gyro stabilizers and similar fixed orientation devices on the aircraft, comprising one radio receiver on the aircraft responsive to said beam and the position of the aircraft therein, a balanced alternating current bridge net-work, and means to couple the output of said receiver to said net-work to produce a steering control signal having a component which represents the lateral displacement of the aircraft with relation to the equi-signal line of said beam and also a component which represents the rate of change of said lateral displacement, said coupling means including a resistor-condenser combination for algebraically adding said components to produce a single resultant steering control signal, a steering element such as a rudder for the aircraft, and means to apply said resultant signal to operate said steering controls to continuously maintain the heading of the aircraft along and continuously coincident with an asymptotic approach to said guide-line for all initial headings of the aircraft and without comparison with a previously established compass base line parallel in direction to said guide-line, the last mentioned means including an electrical balancing circuit having one element thereof which is movably adjusted in unison with the setting of said steering element.

13. A system according to claim 10 in which said means for adding said signal components comprises a plurality of condensers of different capacitances, and means for connecting in circuit the condenser of larger capacitance when the aircraft is located in said beam at a region of lower positional sensitivity and for connecting the condenser of lower capacitance into circuit when the aircraft enters the region of said beam of higher positional sensitivity.

14. A system for automatically controlling the flight of an aircraft along a predetermined course, comprising in combination, a single radio receiver for the reception on the aircraft of a positional signal, a steering element such as a rudder for the aircraft, and control means for said steering element responsive substantially continuously and entirely to said positional signal and independent of any previously fixed orientation of the aircraft, said control means including mechanism effective for all initial headings of the aircraft and responsive to the differential strength and rate of change of the positional signal for operating said steering element to continuously align the heading of the aircraft with an asymptotic approach to said course and thereafter with a heading maintained aligned with said course, said control means also including an electrical balancing circuit having one element thereof which is movably adjusted in unison with the setting of said steering element.

15. A system for automaticaly steering an aircraft in response to an equi-signal radio localizer line set up by a radio beam, comprising in combination, a single localizer radio receiver for producing a double-component signal voltage one component representing lateral displacement of the aircraft with respect to said line and the other component representing rate of change of said displacement, means for algebraically adding said components to produce a resultant voltage, a steering element for the aircraft, a power device for operating said steering element, a directional gyro, manually operable means effective in one position to compare the setting of said steering element with said gyro to return said steering element to streamline position for each incremental change of heading correction, said manually operable means being effective in another position to control said steering element by and continuously in proportion to said resultant voltage independent of said gyro, and thereby to continuously align the aircraft heading with an asymptotic approach to said line.

16. A system for automatically steering an aircraft in response to an equi-signal radio glide path line set up by a radio beam, comprising in combination, a single glide path radio receiver for producing a double-component signal voltage one component representing lateral displacement of the aircraft with respect to said line and the other component representing rate of change of said displacement, means for algebraically adding said components to produce a resultant voltage, a steering element for the aircraft, a power device for operating said steering element, a directional gyro, manually operable means effective in one position to compare the setting of said steering element with said gyro to return said steering element to streamline position for each incremental change of heading correction, said manually operable means being effective in another position to control said steering element by and continuously in proportion to said resultant voltage independent of said gyro, and thereby to continuously align the aircraft heading with an asymptotic approach to said line.

References Cited in the file of this patent

UNITED STATES PATENTS

| | | |
|---|---|---|
| 1,436,280 | Minorsky | Nov. 21, 1922 |
| 1,703,280 | Minorsky | Feb. 26, 1929 |
| 1,865,826 | Brockstedt | July 5, 1932 |
| 2,003,240 | Brockstedt | May 18, 1935 |
| 2,257,757 | Moseley | Oct. 7, 1941 |
| 2,313,583 | Ressler | Mar. 9, 1943 |
| 2,372,185 | Wittkuhns | Mar. 27, 1945 |
| 2,398,421 | Frische et al. | Apr. 16, 1946 |
| 2,419,970 | Roe et al. | May 6, 1947 |
| 2,423,336 | Moseley | July 1, 1947 |
| 2,476,301 | Jenks | July 19, 1949 |
| 2,613,350 | Kellogg | Oct. 7, 1952 |
| 2,613,351 | Lang | Oct. 7, 1952 |

FOREIGN PATENTS

| | | |
|---|---|---|
| 516,567 | Great Britain | Jan. 5, 1940 |

OTHER REFERENCES

"Principles of Radar," M. I. T. Staff, 1944, pages 12–57 to 12–50 incl.